US011340059B1

(12) United States Patent
Furukawa

(10) Patent No.: US 11,340,059 B1
(45) Date of Patent: May 24, 2022

(54) SENSOR HEAD

(71) Applicant: OMRON Corporation, Kyoto (JP)

(72) Inventor: Shinya Furukawa, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/432,947

(22) PCT Filed: Feb. 19, 2020

(86) PCT No.: PCT/JP2020/006434
§ 371 (c)(1),
(2) Date: Aug. 23, 2021

(87) PCT Pub. No.: WO2020/184102
PCT Pub. Date: Sep. 17, 2020

(30) Foreign Application Priority Data

Mar. 13, 2019 (JP) .............................. JP2019-045729

(51) Int. Cl.
*G01B 11/00* (2006.01)
*G01B 11/02* (2006.01)
*G01B 9/02* (2022.01)
(52) U.S. Cl.
CPC ........ *G01B 11/026* (2013.01); *G01B 9/02041* (2013.01); *G01B 9/02042* (2013.01); *G01B 9/02049* (2013.01); *G01B 11/007* (2013.01)
(58) Field of Classification Search
CPC ........................... G01B 11/026; G01B 11/007; G01B 9/02041; G01B 9/02042; G01B 9/02049
See application file for complete search history.

(56) References Cited

U.S. PATENT DOCUMENTS 6,490,083 B1 * 12/2002 McManus ............ A61B 1/3135
359/368
7,442,922 B2 * 10/2008 Knebel .................... H01J 49/04
250/311
7,477,401 B2    1/2009 Marx et al.
(Continued)

FOREIGN PATENT DOCUMENTS

JP    2001235311    8/2001
JP    2012208102    10/2012
(Continued)

OTHER PUBLICATIONS

"International Search Report (Form PCT/ISA/210) of PCT/JP2020/006434", dated Jun. 2, 2020, with English translation thereof, pp. 1-4.
(Continued)

*Primary Examiner* — Jonathan M Hansen
(74) *Attorney, Agent, or Firm* — JCIPRNET

(57) ABSTRACT

A sensor head is provided and achieves improved measurement accuracy while reducing measurement time. The sensor head includes: a case including a first case section having a lens therein, a second case section having an objective lens therein, and a third case section providing connection between the first case section and the second case section. Inside the third case section, a mirror member for folding light incident thereon from the lens toward the objective lens is disposed, and a hollow tube providing communication between through holes respectively formed in the mirror member and the objective lens is provided.

16 Claims, 12 Drawing Sheets

(56) References Cited

U.S. PATENT DOCUMENTS

2006/0097164 A1* 5/2006 Knebel ................ G01Q 30/02
250/310
2020/0005457 A1* 1/2020 Ling ..................... G01N 21/27

FOREIGN PATENT DOCUMENTS

| JP | 2015143652 | 8/2015 |
| JP | 2016165424 | 9/2016 |
| JP | 2017021022 | 1/2017 |
| WO | 2009153067 | 12/2009 |

OTHER PUBLICATIONS

"Written Opinion of the International Searching Authority (Form PCT/ISA/237) of PCT/JP2020/006434", dated Jun. 2, 2020, with English translation thereof, pp. 1-8.

* cited by examiner

SENSOR HEAD

CROSS-REFERENCE TO RELATED APPLICATION

This application is a 371 application of the international PCT application serial no. PCT/JP2020/006434, filed on Feb. 19, 2020, which claims the priority benefit of Japan application no. 2019-045729, filed on Mar. 13, 2019. The entirety of each of the above-mentioned patent applications is hereby incorporated by reference herein and made a part of this specification.

BACKGROUND

Technical Field

The invention relates to a sensor head.

Description of Related Art

A confocal measuring device using a confocal optical system is widely used as a device for measuring the position of a measurement object without contacting the measurement object.

For example, a confocal measuring device described in Patent Document 1 uses a confocal optical system in which a lens for causing chromatic aberration is arranged between a light source and a measurement object. The light emitted toward the measurement object is focused at a distance corresponding to the wavelength thereof. The measuring device can measure the position of the measurement object based on the peak of the wavelength of the light reflected by the measurement object.

In such a measuring device, an apparatus called "sensor head" or the like is arranged toward the measurement object, and light is emitted from the sensor head toward the measurement object. The sensor head has a case in which a space serving as an optical path is formed inside, and the parts constituting the confocal optical system are accommodated in the space.

Patent Document 2 describes a device that uses the above-mentioned confocal optical system to observe a chemical solution (measurement sample) applied on a base material. Patent Document 2 describes that after the chemical solution is applied on the base material from a nozzle, the chemical solution is measured by scanning the sensor head.

RELATED ART

Patent Document

[Patent Document 1] Japanese Laid-Open No. 2012-208102
[Patent Document 2] Japanese Laid-Open No. 2016-165424

SUMMARY

Problems to be Solved

The method of scanning the sensor head after applying the chemical solution on the base material from the nozzle, as described in Patent Document 2, has a problem that it takes time to scan the sensor head. In order to solve this problem, a method is conceivable in which the sensor head can be moved in conjunction with the movement of the nozzle, and then the sensor head is arranged and tilted toward a gap between a tip of the nozzle and the base material for the sensor head to measure the position directly below the nozzle, for example. Alternatively, another method is conceivable in which the sensor head is arranged adjacent to the nozzle and perpendicular to the measurement object (chemical solution) (that is, the sensor head is arranged adjacent to the nozzle so that an axial direction of the nozzle and an optical axis direction of the sensor head are in the same direction), and the chemical solution applied from the nozzle is measured by the sensor head so as to follow the movement of the nozzle.

However, the above-mentioned method of measuring with the sensor head tilted toward the tip of the nozzle has a problem that the error is large as compared with a case where the optical axis of the sensor head is arranged perpendicular to the measurement object for measurement. Further, for the method of measuring in a state where the sensor head is arranged adjacent to the nozzle and the optical axis of the sensor head is arranged perpendicular to the measurement object, since the sensor head is not directed to the tip of the nozzle, the sensor head may not be able to accurately capture the measurement object applied from the nozzle, and this measuring method also causes an error.

Therefore, the invention provides a sensor head that can improve measurement accuracy while reducing measurement time.

Means for Solving the Problems

A sensor head according to an embodiment of the invention is a sensor head of a sensor that measures a position of a measurement object. The sensor head includes: a lens emitting light incident from a light source side along an optical axis and causing chromatic aberration in the light; an objective lens arranged on a measurement object side with respect to the lens, and collecting and emitting light incident from a lens side to the measurement object side and emitting light incident from the measurement object side to the lens side; and a case having an accommodation space inside and accommodating at least the lens and the objective lens in the accommodation space. The case includes a first case section having the lens inside, a second case section having the objective lens inside, and a third case section connecting between the first case section and the second case section, a mirror member bending the light incident from the lens side toward the objective lens side is arranged inside the third case section, and a tube being hollow and communicating through holes respectively formed in the mirror member and the objective lens is provided.

According to this embodiment, a predetermined object (for example, a nozzle for applying a coating solution, a lens of a camera, a suction nozzle, etc.) can be inserted into the hollow tube that communicates the through holes of the mirror member and the objective lens. As a result, the axis of the predetermined object passing through the inside of the tube formed through the objective lens and the optical axis of the sensor head can be positioned substantially coaxially. Thus, measurement can be performed without tilting the sensor head. As a result, the measurement accuracy can be improved while reducing the measurement time.

In the above embodiment, the tube may be arranged to extend in a direction along an optical axis of light emitted from the objective lens to the measurement object side.

According to this embodiment, measurement can be performed at the same time as coating while the axis of the object inserted through the inside of the tube and the optical axis of the light emitted to the measurement object side are positioned substantially coaxially. Therefore, the measurement accuracy can be further improved while reducing the time.

In the above embodiment, a diaphragm mechanism fixing an object inserted into the tube may be provided at an upper end of the tube. Further, the diaphragm mechanism may include a diaphragm blade that changes a diaphragm diameter, and the object may be fixed by bringing the diaphragm blade into contact with an outer peripheral surface of the object.

According to this embodiment, with the diaphragm mechanism for fixing the object to which the coating solution is applied, the object can be stably fixed. Thus, the alignment of the object can be facilitated, and as a result, the measurement accuracy can be further improved.

In the above embodiment, a half mirror member branching light emitted from the objective lens to the lens side that causes chromatic aberration may be provided between the objective lens and the lens that causes chromatic aberration, and an imaging device receiving light branched by the half mirror member and generating image information indicating a measurement position of the sensor head may be provided. Further, the imaging device may include: a light receiving lens collecting the light branched by the half mirror member; and an imaging element generating the image information based on light collected by the light receiving lens.

According to this embodiment, with the half mirror member and the imaging device that receives the light branched by the half mirror member and generates the image information, the measurement position of the sensor head can be confirmed based on the image information generated by the imaging device.

In the above embodiment, a half mirror member branching the light emitted from the objective lens to the lens side that causes chromatic aberration may be provided between the objective lens and the lens that causes chromatic aberration, and an opening/closing window receiving light branched by the half mirror member for monitoring the measurement position of the sensor head may be provided.

According to this embodiment, with the opening/closing window capable of monitoring the measurement position of the sensor head based on the light branched by the half mirror member, the measurement position can be monitored through the opening/closing window, and whether or not an error has occurred can be visually confirmed, for example.

Effects

According to the invention, it is possible to provide a sensor head that can improve measurement accuracy while reducing measurement time.

DESCRIPTION OF THE EMBODIMENTS

Figure 1:
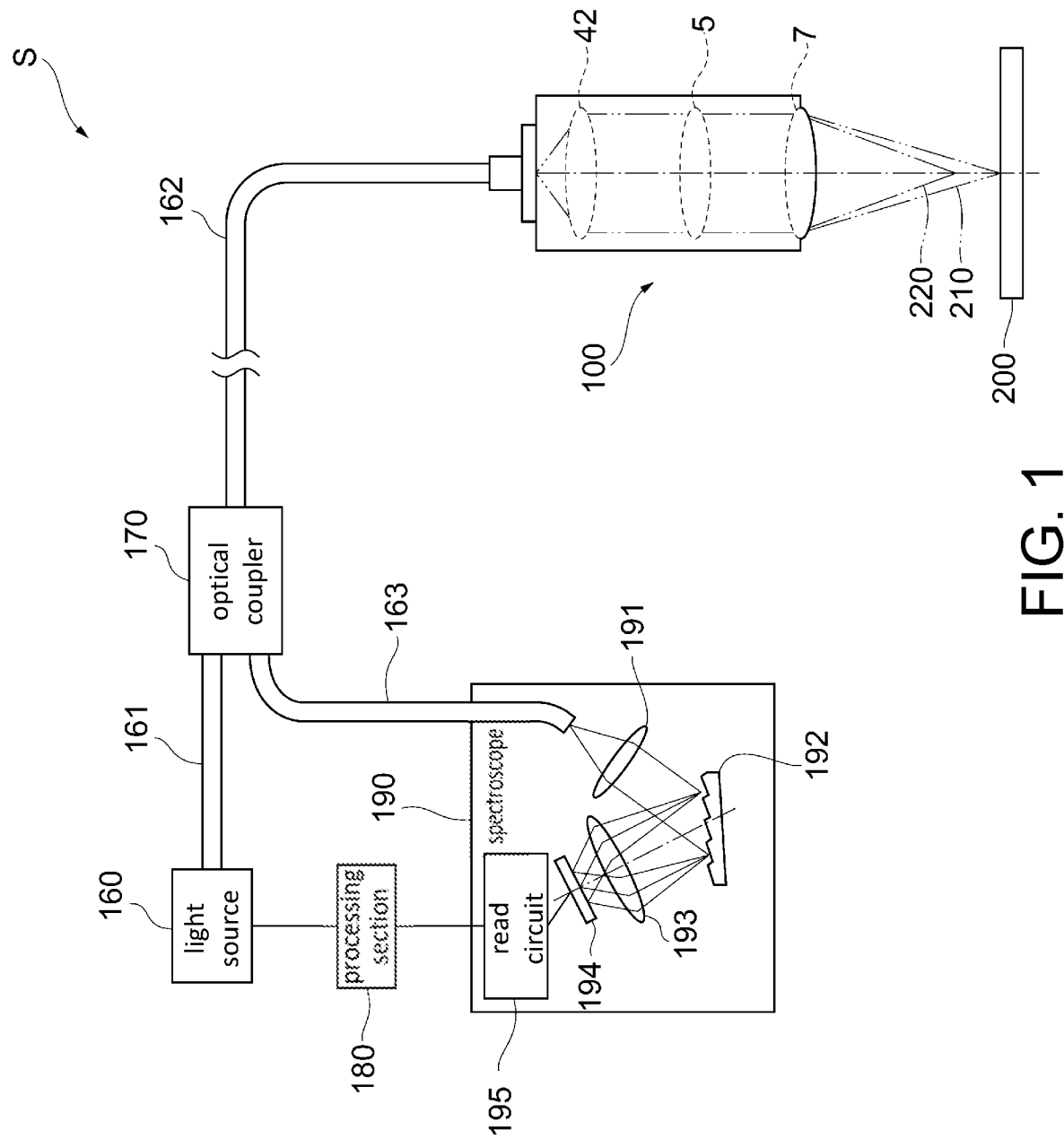
FIG. 1 is a schematic view of the confocal measuring device.

Embodiments of the invention will be described with reference to the accompanying drawings. In each drawing, parts assigned with the same reference numerals have the same or similar configurations.

FIG. 1 is a schematic view of a confocal measuring device S. The confocal measuring device S is a device that measures the position of a measurement object 200, and includes a light source 160, a first optical fiber 161, a second optical fiber 162, a third optical fiber 163, an optical coupler 170, a spectroscope 190, a processing section 180, and a sensor head 100.

The light source 160 outputs white light to the first optical fiber 161. The light source 160 may adjust the light amount of the white light based on a command of the processing section 180. The first optical fiber 161 may be any optical fiber, for example, a refractive index distribution type fiber having a core diameter of 50 μm. The first optical fiber 161 may be connected to a fiber having a smaller core diameter before being connected to the optical coupler 170.

The optical coupler 170 is a filter type coupler, a spatial optical system type coupler, a fusion extension type coupler or a waveguide type coupler that is connected to the first optical fiber 161, the second optical fiber 162, and the third optical fiber 163, and brings a first transmission waveform and a second transmission waveform close to each other, wherein the first transmission waveform represents the relationship between wavelength and light amount when light is transmitted from the first optical fiber 161 to the second optical fiber 162, and the second transmission waveform represents the relationship between wavelength and light amount when light is transmitted from the second optical fiber 162 to the third optical fiber 163.

The sensor head 100 is connected to the second optical fiber 162, and accommodates a lens 5 that causes chromatic aberration along an optical axis direction in the incident white light and irradiates the measurement object 200 with light with chromatic aberration. The sensor head 100 accommodates a collimator lens 42 that converts the white light emitted from an end surface of the second optical fiber 162 into parallel light, the lens 5 that causes chromatic aberration along the optical axis direction, and an objective lens 7 that collects the light with chromatic aberration on the measurement object 200. In this example, light 210 having a first wavelength that has a relatively long focal length and light 220 having a second wavelength that has a relatively short focal length are shown. In the case of this example, the light 210 having the first wavelength is focused on a surface of the measurement object 200, while the light 220 having the second wavelength is focused in front of the measurement object 200.

The light reflected by the surface of the measurement object 200 is collected by the objective lens 7, collected by the collimator lens 42 through the lens 5, and returned to the core of the second optical fiber 162. Since the light 210 having the first wavelength among the reflected light is focused on the end surface of the second optical fiber 162, most of it enters the second optical fiber 162, but light having other wavelengths is not focused on the end surface of the second optical fiber 162 and most of it does not enter the second optical fiber 162. The reflected light that enters the second optical fiber 162 is transmitted to the third optical fiber 163 via the optical coupler 170 and input to the spectroscope 190. The reflected light that enters the second optical fiber 162 is also transmitted to the first optical fiber 161 via the optical coupler 170, but is terminated by the light source 160.

The spectroscope 190 is connected to the third optical fiber 163, and acquires the reflected light reflected by the measurement object 200 and collected by the sensor head 100 via the second optical fiber 162, the optical coupler 170, and the third optical fiber 163 and measures the spectrum of the reflected light. The spectroscope 190 includes a first lens 191 that collects the reflected light emitted from the third optical fiber 163, a diffraction grating 192 that disperses the reflected light, a second lens 193 that collects the dispersed reflected light, a light receiving element 194 that receives the dispersed reflected light, and a read circuit 195 that reads a light receiving signal of the light receiving element 194. The read circuit 195 reads the wavelength and light amount of the received light based on the light receiving signal of the light receiving element 194. The read wavelength and light amount of the light are replaced by the position of the measurement object 200 by the processing section 180. In the case of this example, the light 210 having the first wavelength appears as a peak, and the position corresponding to the wavelength thereof is measured accurately.

The confocal measuring device S can measure the position of the measurement object 200 with a resolution of several tens of nm (nanometers) if the sensor head 100 is in a stationary state.

First Embodiment

Figure 2:
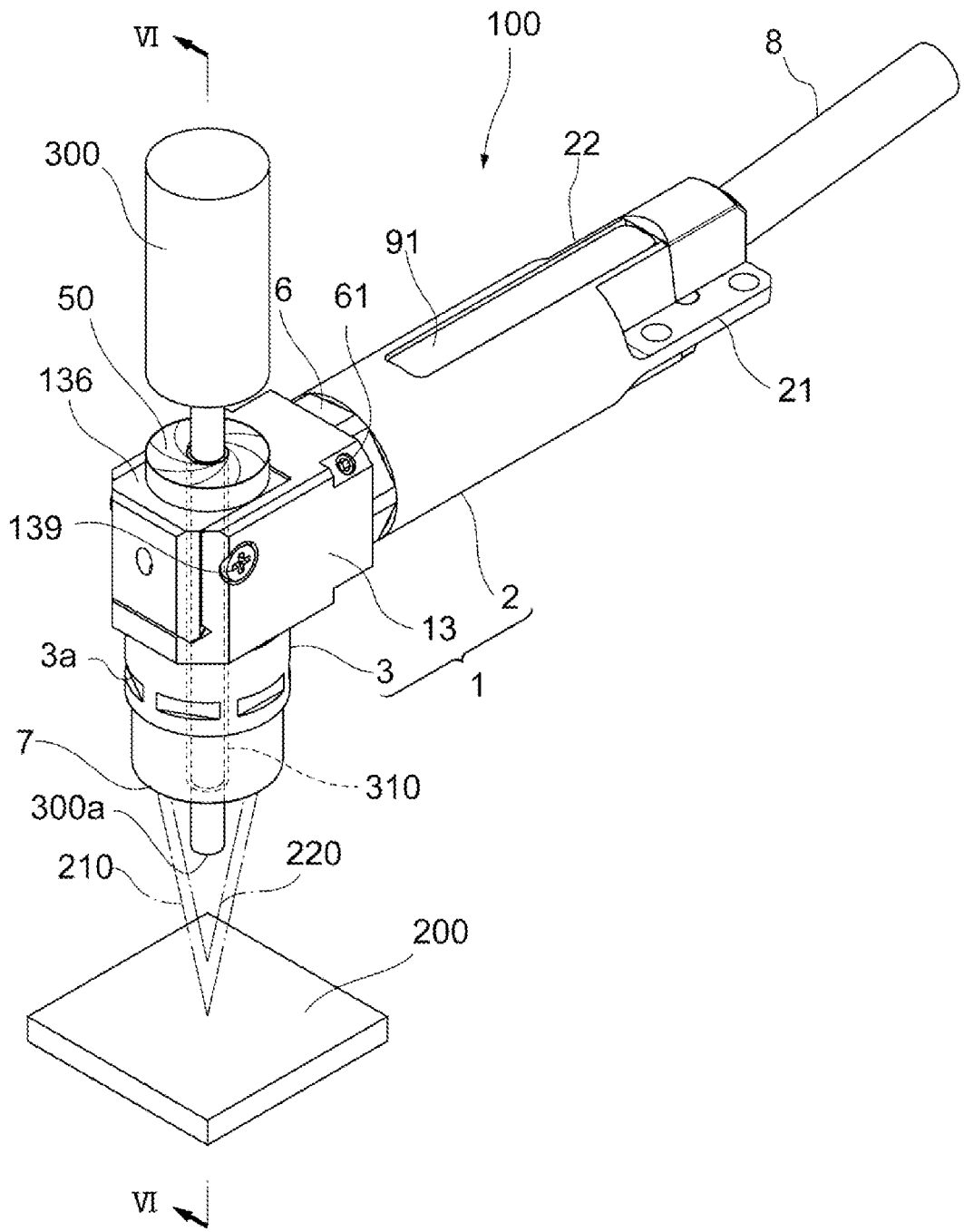
FIG. 2 is a perspective view showing the sensor head according to the first embodiment.

Subsequently, the configuration of the sensor head 100 according to the first embodiment will be described. FIG. 2 is a perspective view showing the sensor head 100. The sensor head 100 constitutes a part of a sensor that measures the position of the measurement object 200, and includes a case 1. The case 1 has a first case section 2, a second case section 3, and a third case section 13.

The first case section 2 has, for example, a substantially cylindrical shape, and the lens 5 (see FIG. 3, etc.) described later is arranged inside the first case section 2. A fiber case 8 is connected to an end of the case 1. Inside the fiber case 8, an optical fiber that guides the white light emitted from the light source to the first case section 2 is arranged. The lens 5 causes chromatic aberration in the direction along the optical axis in the light emitted from the optical fiber.

The second case section 3 has, for example, a substantially cylindrical shape, and an objective lens group 7 described later is arranged inside the second case section 3. The second case section 3 fixes the objective lens group 7 so as to expose a part of the objective lens group 7. The objective lens group 7 in the present embodiment has a hollow structure. Through holes (the through holes 74a, 73a, 72a, and 71a shown in FIG. 6) through which an object 300 can be inserted are formed in substantially the central portion of each of the objective lens group 7. The object 300 in the present specification includes, for example, a nozzle for applying a coating solution, a lens of a camera, a suction nozzle, etc. For example, when the lens of the camera is inserted, an image of the measurement object and height information can be measured at the same time. For example, when the suction nozzle for picking and placing an electronic component or the like is inserted, the distance to the target can be measured and the suction nozzle can be brought close to the target while checking the result. As a result, the target can be sucked by a constant pressure regardless of the installation state of the target, and the target vulnerable to pressure can be prevented from being damaged.

The third case section 13 has, for example, an angular outer shape, and connects the first case section 2 and the second case section 3. Inside the third case section 13, a mirror member 135 (FIG. 3, etc.) that bends the optical axis is arranged. The mirror member 135 in the present embodiment has a hollow structure. A through hole (the through hole 135a shown in FIG. 6) through which the object 300 can be inserted is formed in a substantially central portion of the mirror member 135.

A cover member 136 is provided at an open portion of a bent portion of the third case section 13, and the cover member 136 is formed with a through hole 136a (see FIG. 3) through which the object 300 for applying the coating solution (for example, chemical solution) can be inserted. Inside the second case section 3 and the third case section 13, a cylindrical tube 310 communicating the through holes of the objective lens group 7 having a hollow structure and the mirror member 135 is provided. The tube 310 shown in FIG. 2, etc. is formed so as to communicate the through holes of the cover member 136, the mirror member 135, and the objective lens group 7 in the third case section 13. The tube 310 has, for example, a substantially cylindrical shape with both ends open, and is formed so that the object 300 can be inserted into the tube 310. In the present embodiment, it is preferable that the tube 310 is arranged to extend in the direction along the optical axis of the light emitted from the objective lens group 7 to the measurement object side. As a result, the axis of the object 300 inserted into the tube 310 and the optical axis of the light emitted to the measurement object side can be aligned with each other for measurement, so that the area directly below the object 300 can be measured by the sensor head 100 at the same time as the coating. As shown in FIG. 2, the object 300 passes through the inside of the third case section 13 and the second case section 3 through the cylindrical tube 310, and is arranged in a state of protruding from the inside of the second case section 3 toward the side of the measurement object 200.

The diaphragm mechanism 50 is a mechanism for fixing the object 300 inserted into the tube 310. The diaphragm mechanism 50 is arranged at an upper end 310a (see FIG. 6) of the tube 310, and fixes the object 300 outside the case 1. The diaphragm mechanism 50 is provided, for example, on the upper surface of the third case section 13 (the upper surface of the third case section 13 in the side view shown in FIG. 5). The diaphragm mechanism 50 has an opening for inserting the object 300 at substantially the center. The diaphragm mechanism 50 has diaphragm blades (described later) that change the diaphragm diameter, and fixes the object 300 by bringing the diaphragm blades into contact with the outer peripheral surface of the object 300. Details of the diaphragm mechanism 50 will be described later.

The sensor head 100 is used so that the objective lens group 7 is directed toward the measurement object 200. The direction of the light transmitted through the lens 5 and having chromatic aberration is changed to the direction toward the objective lens group 7 by the mirror member 135, and the light is refracted and collected by the objective lens group 7, and emitted to the side of the measurement object

200. FIG. 2 illustrates the light 210 having the first wavelength that has a relatively long focal length and the light 220 having the second wavelength that has a relatively short focal length. The light 210 having the first wavelength is focused on the surface of the measurement object 200, while the light 220 having the second wavelength is focused in front of the measurement object 200.

The light reflected by the surface of the measurement object 200 enters the objective lens group 7. The light is collected by the objective lens group 7, and the direction thereof is changed to the direction toward the lens 5 by the mirror member 135 and transmitted through the lens 5, and travels to the optical fiber side. The light 210 having the first wavelength is focused on the optical fiber, and most of it enters the optical fiber. On the other hand, light having other wavelengths is not focused on the optical fiber and hardly enters the optical fiber.

The light entering the optical fiber is guided to the spectroscope 190 (see FIG. 1) connected to the optical fiber. The spectroscope 190 detects the peak of the wavelength of the light and measures the position of the measurement object 200 based on the peak.

Configuration Example

Figure 3:
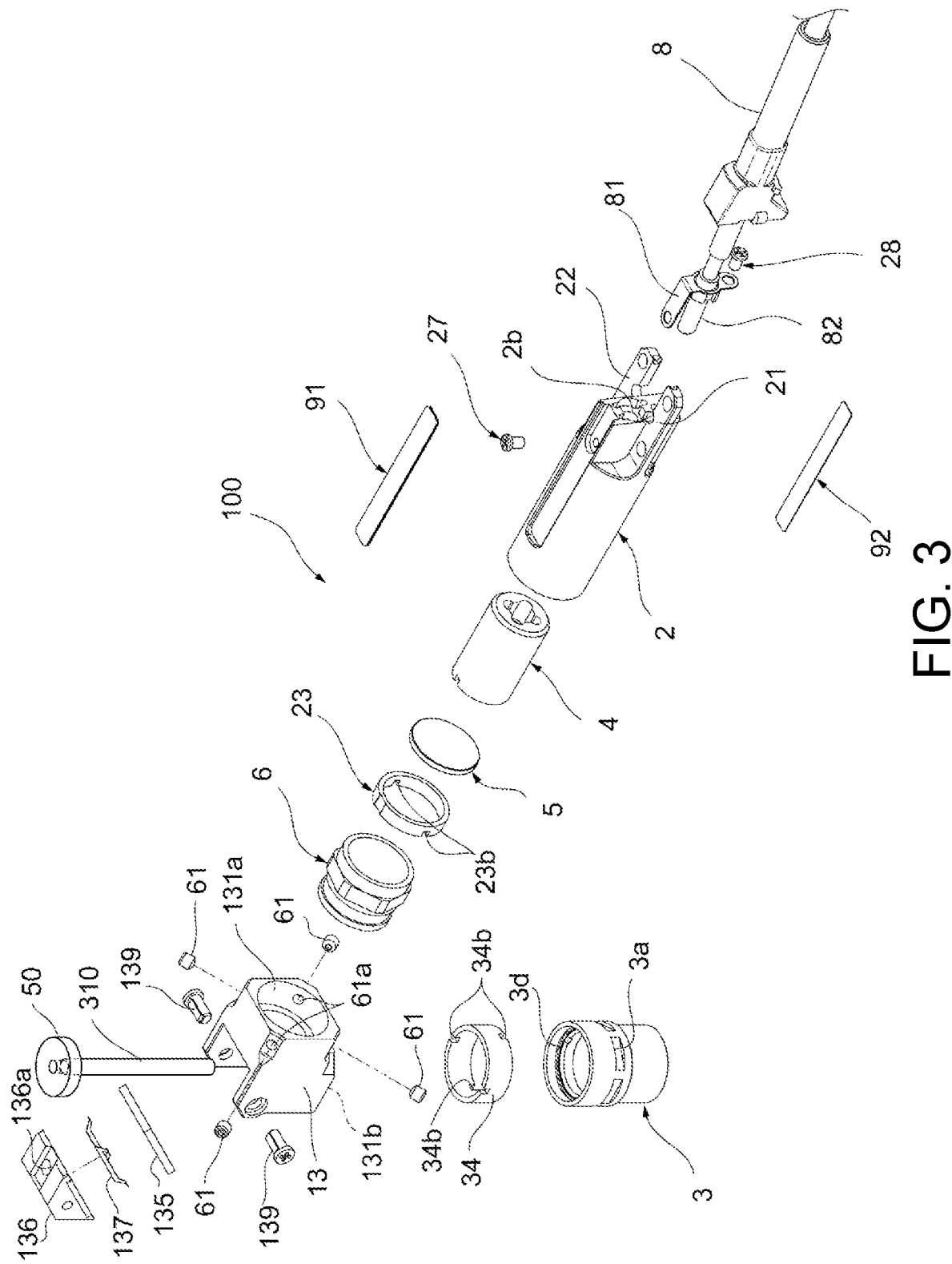
FIG. 3 is an exploded perspective view showing a part of the sensor head shown in FIG. 2 in an exploded manner.
Figure 4:
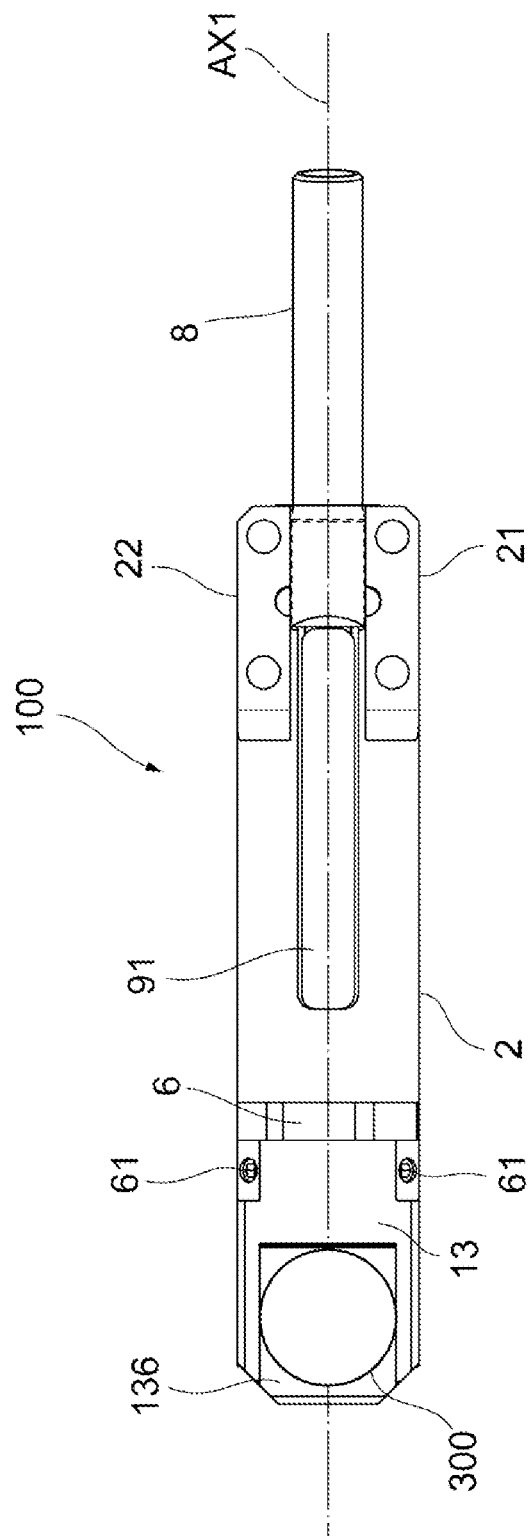
FIG. 4 is a top view showing the sensor head of FIG. 2.
Figure 5:
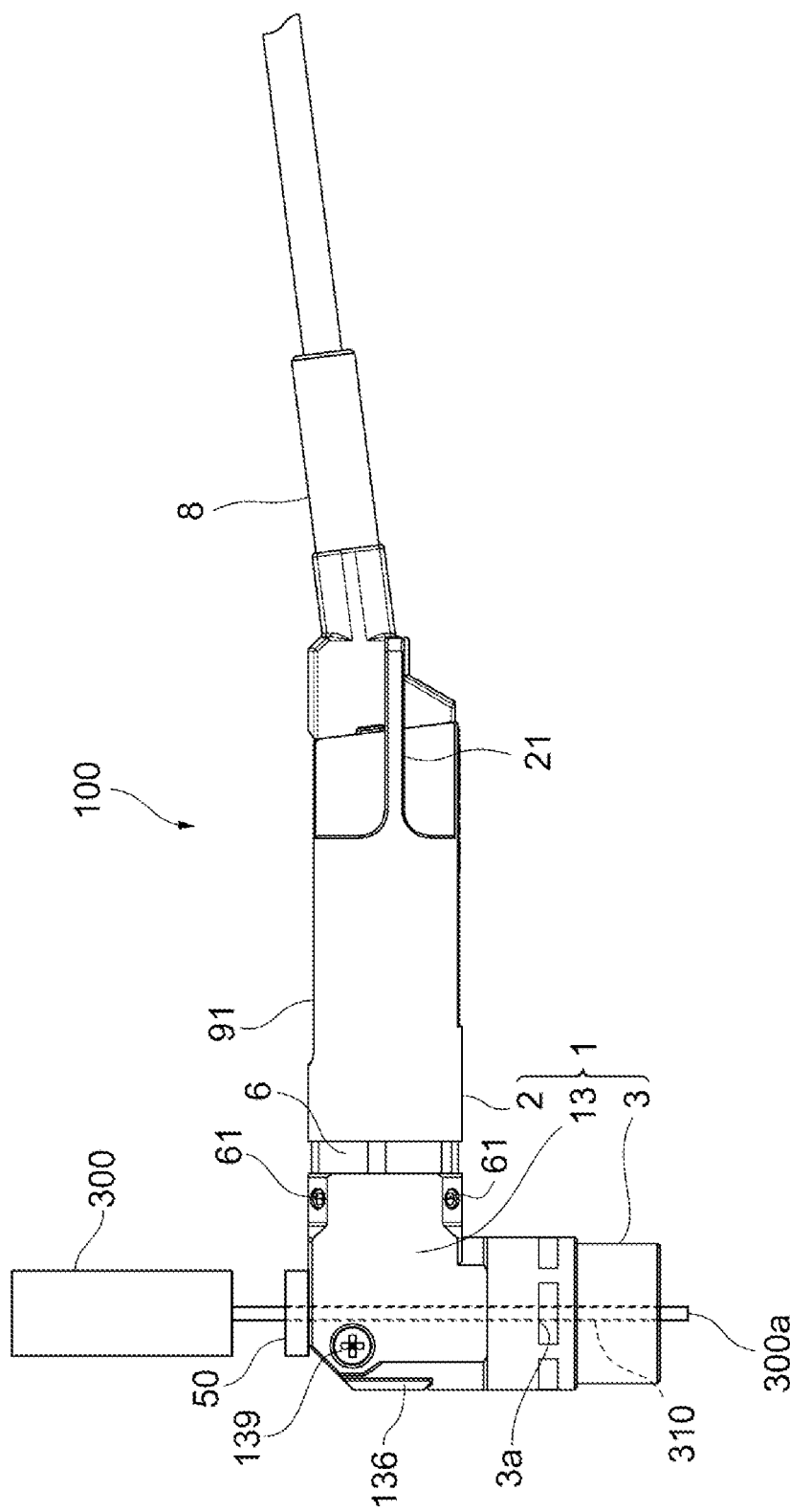
FIG. 5 is a side view showing the sensor head of FIG. 2.
Figure 6:
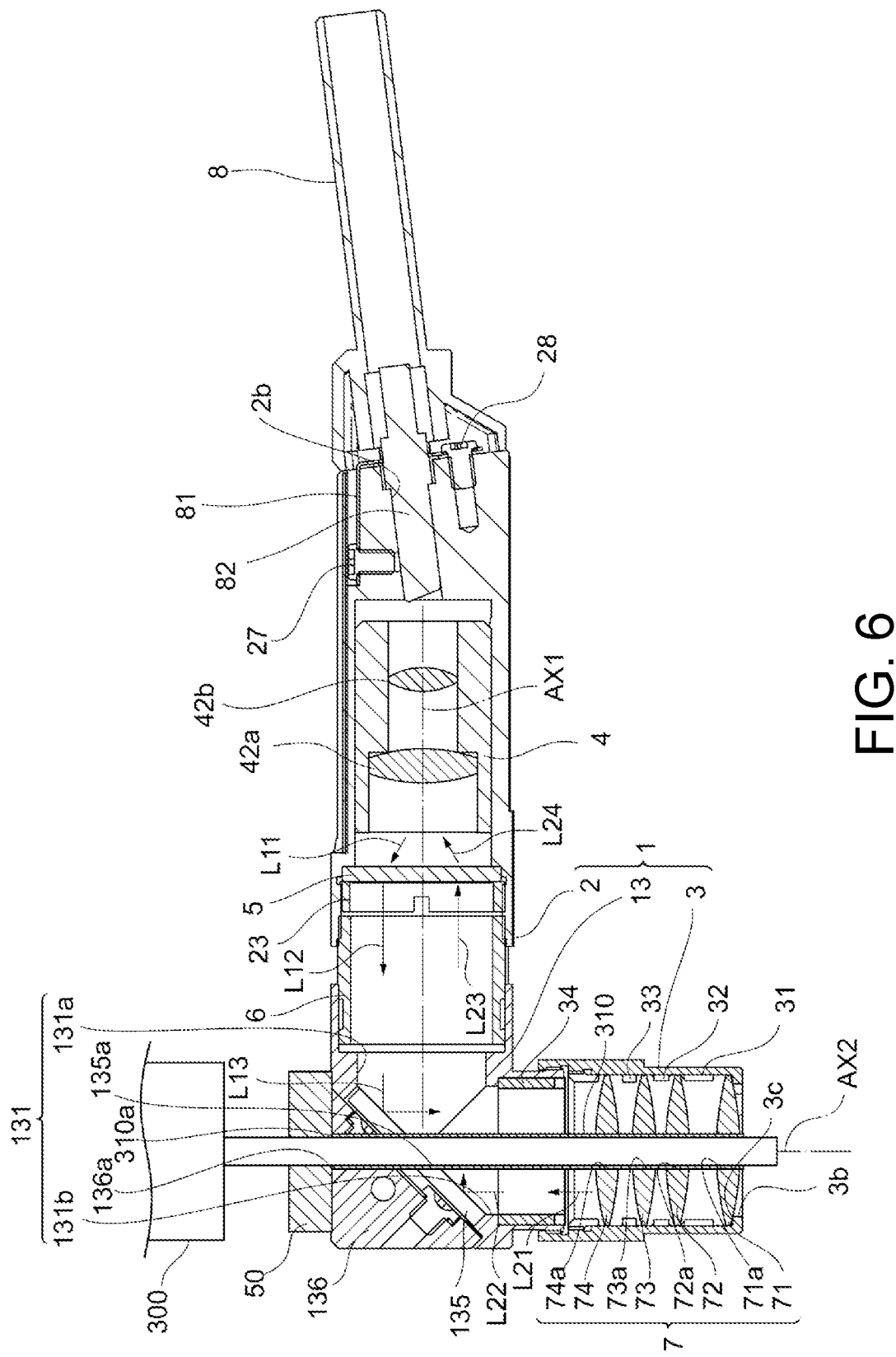
FIG. 6 is a cross-sectional view showing the VI-VI cross section of FIG. 2.

Next, an example of the configuration of the sensor head 100 will be described with reference to FIG. 3 to FIG. 6. FIG. 3 is an exploded perspective view showing a part of the sensor head 100 in an exploded manner. FIG. 4 is a top view (plan view) showing the sensor head 100. FIG. 5 is a side view showing the sensor head 100. FIG. 6 is a cross-sectional view showing the VI-VI cross section of FIG. 2.

<First Case Section>

The first case section 2 has a substantially cylindrical shape with one end open, and is arranged so that the central axis thereof substantially coincides with a first axis AX1 (see FIG. 6). The first axis AX1 is a virtual straight line.

As shown in FIG. 3 and FIG. 4, fixing portions 21 and 22 used for fixing the sensor head 100 are formed at the other end of the first case section 2. As shown in FIG. 3, a communication hole 2*b* is formed between the fixing portions 21 and 22 to communicate the inside and outside of the first case section 2. The first case section 2 accommodates a lens holder 4 and the lens 5 inside.

The lens holder 4 is a member having a substantially cylindrical shape. The inner diameter of the lens holder 4 differs depending on the parts. As shown in FIG. 6, inside the lens holder 4*a*, a first collimating lens 42*a* and a second collimating lens 42*b* are arranged.

The first collimating lens 42*a* is fixed inside the lens holder 4. The second collimating lens 42*b* is arranged at a distance from the first collimating lens 42*a*.

The entire lens holder 4 is accommodated inside the first case section 2, and is fixed to the first case section 2 by a screw (not shown) penetrating the first case section 2. As a result, both the first collimating lens 42*a* and the second collimating lens 42*b* shown in FIG. 6 are arranged with optical axes substantially coinciding with the first axis AX1. The lens holder 4 can be moved in the direction along the first axis AX1 (hereinafter, referred to as "first axis AX1 direction") by loosening the screw (not shown). By moving the lens holder 4, the positions of the first collimating lens 42*a* and the second collimating lens 42*b* can be adjusted.

The lens 5 is arranged on the side of the measurement object 200 with respect to the lens holder 4 so that the optical axis thereof substantially coincides with the first axis AX1. The lens 5 causes chromatic aberration in the first axis AX1 direction in the incident light. A lens with a focal length inversely proportional to the wavelength of the light can be adopted as the lens 5.

<Second Case Section>

The second case section 3 is connected to the first case section 2 via the third case section 13. The second case section 3 has a substantially cylindrical shape. One end of the second case section 3 is open, and the other end is formed with an opening 3*b* (see FIG. 6). As shown in FIG. 3, a female threaded portion 3*d* is formed on the inner peripheral surface of the second case section 3 on one end side. The opening 3*b* has a substantially perfect circular shape when viewed along the central axis of the second case section 3. As shown in FIG. 3, a plurality of recesses 3*a* are formed on the outer peripheral surface of the second case section 3. The bottom surface of the recess 3*a* is a flat surface. As shown in FIG. 6, the second case section 3 accommodates the objective lens group 7, spacers 31 to 33, and a pressing member 34 inside.

The objective lens group 7 is an example of the "objective lens" according to the invention. The objective lens group 7 includes a first objective lens 71, a second objective lens 72, a third objective lens 73, and a fourth objective lens 74. Each lens of the objective lens group 7 has a substantially circular shape, and the diameter thereof is substantially the same as the inner diameter of the second case section 3.

The "objective lens" according to the invention may be composed of a plurality of lenses such as the objective lens group 7, or may be a single lens.

The spacers 31 to 33 each have a substantially annular shape. The outer diameters of the spacers 31 to 33 are substantially the same as the outer diameter of each lens of the objective lens group 7.

The pressing member 34 has a substantially annular shape, and the outer peripheral surface thereof is engaged with and fixed to the inner peripheral surface of the second case section 3. The method of engaging the pressing member 34 with the second case section 3 is not particularly limited. For example, the pressing member 34 and the second case section 3 are fixed to each other by screwing a male threaded portion (not shown) formed on the outer peripheral surface of the pressing member 34 with the female threaded portion 3*d* on the inner peripheral surface of the second case section 3. In this way, one end side of the pressing member 34 is engaged with and fixed to the inner peripheral surface of the second case section 3, and the other end side of the pressing member 34 is engaged with and fixed to the inner peripheral surface of a second passage portion 131*b* of the third case section 13, which will be described later.

The lenses of the objective lens group 7 are spaced apart from each other and are arranged in a straight line so that the optical axes thereof substantially coincide with a second axis AX2. Specifically, the first objective lens 71 is arranged so as to come into contact with a peripheral edge 3*c* of the opening 3*b* of the second case section 3 and be exposed from the opening 3*b*. The second objective lens 72 is arranged so as to face the first objective lens 71 with the spacer 31 interposed therebetween. The third objective lens 73 is arranged so as to face the second objective lens 72 with the spacer 32 interposed therebetween. The fourth objective lens 74 faces the third objective lens 73 with the spacer 33 interposed therebetween, and is interposed between the spacer 33 and the pressing member 34 and fixed inside the second case section 3. The male threaded portion (not shown) on the outer peripheral surface of the pressing member 34 is screwed with the female threaded portion 3*d* on the inner peripheral surface of the second case section 3.

Each lens of the objective lens group 7 is arranged so as not to cause wavefront aberration in the transmitted light.

<Fiber Case>

As shown in FIG. 3 and FIG. 6, the fiber case 8 is fixed to the first case section 2 via a leaf spring 81. The leaf spring 81 is fixed to the upper part of the first case section 2 by a screw 27, and is fixed to an end of the first case section 2 by a screw 28. The fiber case 8 accommodates an optical fiber (not shown) inside. A ferrule 82 is connected to a tip of the optical fiber. As shown in FIG. 4, the ferrule 82 is inserted into the communication hole 2b of the first case section 2.

As shown in FIG. 3, an upper label 91 is attached to the upper part of the first case section 2 so as to cover the screw 27. Further, a lower label 92 is attached to the lower part of the first case section 2 so as to cover a screw (not shown). A logo such as a product name may be printed on the upper label 91 and the lower label 92.

<Pressing Member, Connecting Member>

As shown in FIG. 3 and FIG. 6, a connecting member 6 and the pressing member 23 each have a substantially annular shape. A plurality of notches 23b are formed at an end of the pressing member 23. The outer diameter of the pressing member 23 is substantially the same as the outer diameter of the connecting member 6, and the inner diameter of the pressing member 23 is substantially the same as the inner diameter of the connecting member 6. Further, the dimension of the pressing member 23 in the direction along the central axis is smaller than the dimension of the connecting member 6 in the same direction.

The method of engaging the outer peripheral surface of the pressing member 23 with the inner peripheral surface of the first case section 2 is not particularly limited. For example, the male threaded portion (not shown) formed on the outer peripheral surface of the pressing member 23 may be screwed with the female threaded portion of the first case section 2. By engaging a tool (not shown) with the notches 23b, the operator can transmit torque from the tool to the pressing member 23 and screw the male threaded portion formed on the outer peripheral surface of the pressing member 23. As a result, the pressing member 23 is arranged inside the first case section 2 on the side of the measurement object 200 with respect to the lens 5 so that the central axis thereof substantially coincides with the first axis AX1.

When the pressing member 23 is arranged inside the first case section 2, the lens 5 is pressed to the light source side by the pressing member 23. The lens 5 is interposed between the pressing member 23 and a stepped portion 25 of the first case section 2, and is fixed inside the first case section 2.

The method of engaging the outer peripheral surface of the connecting member 6 with the inner peripheral surface of the first case section 2 is not particularly limited. For example, the male threaded portion (not shown) formed on the outer peripheral surface of the connecting member 6 may be screwed with the female threaded portion of the first case section 2. The connecting member 6 engaged with the inner peripheral surface of the first case section 2 protrudes to the outside from one end of the first case section 2. The third case section 13 is connected to and fixed to a portion of the connecting member 6 that protrudes to the outside from one end of the first case section 2. That is, the third case section 13 is connected to the first case section 2 via the connecting member 6. The portion of the third case section 13 on the side of the first case section 2 is connected so that the central axis thereof substantially coincides with the first axis AX1.

<Third Case Section>

The third case section 13 is arranged between the first case section 2 and the second case section 3, and connects the first case section 2 and the second case section 3. The third case section 13 has an angular outer shape and a bent shape. As shown in FIG. 5, the sensor head 100 in the present embodiment has a substantially L shape in a side view, which is bent in the third case section 13.

The third case section 13 has a shape in which the end on the side of the first case section 2 and the end on the side of the second case section 3 are open. Further, the third case section 13 has a shape in which the outer side of the bent portion (the upper left end side of the third case section 13 in FIG. 4) is open. The mirror member 135, the cover member 136, etc. described later are arranged in the open portion of the bent portion of the third case section 13.

As shown in FIG. 6, a communication passage 131 communicating the inside of the first case section 2 and the inside of the second case section 3 is formed inside the third case section 13. The communication passage 131 connects an opening portion of the third case section 13 that is open on the side of the first case section 2 and an opening portion of the third case section 13 that is open on the side of the second case section 3. The communication passage 131 has a bent shape. In the present embodiment, the communication passage 131 has a shape bent at 90 degrees, but the angle is not limited to 90 degrees and may be an angle other than 90 degrees. The communication passage 131 has a substantially cylindrical first passage portion 131a extending along the first axis AX1 direction and a substantially cylindrical second passage portion 131b extending along the second axis AX2 direction.

As shown in FIG. 3 and FIG. 6, the connecting member 6 is connected to the first passage portion 131a on the side of the first case section 2. The inner diameter of the first passage portion 131a is larger than the outer diameter of the connecting member 6. One end side of the connecting member 6 is accommodated inside the first passage portion 131a, and the other end side of the connecting member 6 is fixed while being accommodated inside the first case section 2. In other words, the third case section 13 on the side of the first passage portion 131a is fixed to the first case section 2 via the connecting member 6. Details of the method of fixing the third case section 13 on the side of the first passage portion 131a and the connecting member 6 will be described later.

As shown in FIG. 3 and FIG. 6, the pressing member 34 is connected to the second passage portion 131b on the side of the second case section 3. A plurality of notches 34b (FIG. 3) are formed at an end of the pressing member 34. The inner diameter of the second passage portion 131b is larger than the outer diameter of the pressing member 34. One end side of the pressing member 34 is arranged inside the second passage portion 131b, and the other end side of the pressing member 34 is fixed while being arranged inside the second case section 3. In other words, the third case section 13 on the side of the second passage portion 131b is fixed to the second case section 3 via the pressing member 34.

As shown in FIG. 3, the third case section 13 is open on the outer side of the bent portion of the communication passage 131 (the upper left end side of the third case section 13 in FIG. 5), and the mirror member 135 is arranged in the opening portion. The mirror member 135 bends the optical axis. The mirror member 135 has a plate-like shape. As shown in FIG. 6, the mirror member 135 is arranged so as to be inclined with respect to the first axis AX1 direction and the second axis AX2 direction. In the present embodiment, the mirror member 135 bends the optical axis in the first axis AX1 direction to the optical axis in the second axis AX2 direction. That is, the mirror member 135 bends the light incident from the side of the lens 5 toward the side of the objective lens group 7 at a substantially right angle, and bends the light incident from the side of the measurement object 200 toward the side of the lens 5 at a substantially right angle. In the present embodiment, the first axis AX1 direction is perpendicular to the second axis AX2 direction. However, the angle between the first axis AX1 direction and the second axis AX2 direction is not limited to 90 degrees, and may be an angle other than 90 degrees.

As shown in FIG. 3 and FIG. 6, the cover member 136 is arranged so as to cover the mirror member 135. The cover member 136 has a triangular shape in a side view. As described above, the cover member 136 has the through hole 136a (see FIG. 3) through which the object 300 can be inserted. An elastic member 137 is arranged between the mirror member 135 and the cover member 136, and the cover member 136 is fixed to the outer peripheral side of the bent portion of the third case section 13 by, for example, a screw 139, but may also be fixed by using another member. The elastic member 137 holds the mirror member 135 in a state of pressing the mirror member 135. By arranging the elastic member 137 between the mirror member 135 and the cover member 136, when the cover member 136 is fixed with the screw 139, the mirror member 135 is fixed in a state of being pressed by the elastic member 137.

By arranging the cover member 136 having a triangular shape in a side view at the bent portion of the third case section 13, as shown in FIG. 4, the tip end side (the side of the third case section 13) of the sensor head 100 has a substantially rectangular parallelepiped shape. Since the tip end side of the sensor head 100 has a substantially rectangular parallelepiped shape, the alignment can be facilitated as compared with a configuration in which the entire sensor head has a substantially cylindrical shape. Further, in the present embodiment, as shown in FIG. 2 to FIG. 5, since the third case section 13 has an angular outer shape, the position of the mirror member 135 arranged inside the third case section 13 can be easily adjusted.

Operation Example

The white light emitted by the light source is guided to the side of the sensor head 100 by the optical fiber and reaches the ferrule 82. The light enters the inside of the case 1 from the ferrule 82 while diffusing.

A part of the light that enters the inside of the case 1 enters the inside of the lens holder 4. The light passes through the second collimating lens 42b and the first collimating lens 42a in order. The first collimating lens 42a and the second collimating lens 42b change the traveling direction of the light incident from the light source side and emit the light to the side of the measurement object 200. Specifically, as shown by the arrow L11 in FIG. 6, the light emitted from the first collimating lens 42a and directed toward the lens 5 travels along the first axis AX1.

The lens 5 causes chromatic aberration in the light incident from the side of the first collimating lens 42a, and emits the light along the first axis AX1, as shown by the arrow L12. The optical axis of the light emitted along the first axis AX1 is bent by the mirror member 135 in the direction along the second axis AX2 (the arrow L13 shown in FIG. 6), and the light is refracted and collected by the objective lens group 7, passes through the opening 3b of the second case section 3, and is emitted toward the measurement object 200.

The light reflected by the surface of the measurement object 200 passes through the opening 3b of the second case section 3 and enters the objective lens group 7. The objective lens group 7 refracts the incident light and emits the light to the side of the mirror member 135 along the second axis AX2 as shown by the arrow L21. The optical axis of the light directed from the objective lens group 7 toward the mirror member 135 is bent in the direction along the first axis AX1 by the mirror member 135 (the arrow L22 shown in FIG. 6), and the light is directed to the side of the lens 5 (the arrow L23 shown in FIG. 6). The lens 5 transmits the light incident from the side of the measurement object 200 and emits the light to the light source side as shown by the arrow L24. The first collimating lens 42a and the second collimating lens 42b collect the light incident from the side of the measurement object 200 and emit the light to the light source side.

Further, the connecting member 6 is arranged between the lens 5 and the third case section 13. At this position, the light travels along the first axis AX1 which is also the optical axis. Therefore, according to this configuration, it is possible to reduce the influence of variations in the dimensions of the case 1 and suppress a decrease in measurement accuracy as compared with a case in which the connecting member 6 is arranged at a position where the light travels so as to be inclined with respect to the first axis AX1.

In addition, when the third case section 13 and the first case section 2 are connected via the connecting member 6, an external force in the direction of the first axis AX1 may act on the connecting member 6. If the connecting member 6 also has a function of pressing and fixing the lens 5, the fixing of the lens 5 may become unstable due to the action of such an external force.

In contrast thereto, in the sensor head 100, the pressing member 23 that presses and fixes the lens 5 to the light source side is arranged separately from the connecting member 6 between the connecting member 6 and the lens 5. Therefore, even if an external force in the direction of the first axis AX1 acts on the connecting member 6, the external force does not reach the pressing member 23. As a result, the first case section 2 and the third case section 13 can be connected via the connecting member 6 while the lens 5 is stably fixed.

Further, in the direction of the first axis AX1, the dimension of the pressing member 23 is smaller than the dimension of the connecting member 6. According to this aspect, by making the dimension of the pressing member 23 relatively small, the dimension of the connecting member 6 can be made relatively large, and the first case section 2 and the second case section 3 can be reliably connected.

Furthermore, the second case section 3 has the recesses 3a formed on the outer peripheral surface thereof, and the bottom surface of the recess 3a is a flat surface. According to this aspect, when the sensor head 100 is assembled, the tool can be stably brought into contact with the bottom surfaces of the recesses 3a, and torque can be transmitted to the second case section 3 formed with the recesses 3a. As a result, while the first case section 2 and the second case section 3 each having a substantially cylindrical shape are used for the case 1, the sensor head 100 can be easily assembled by applying torque.

In the sensor head 100, the recesses 3a are formed only in the second case section 3. However, the invention is not limited to this aspect, and the recesses 3a may be formed in at least one of the first case section 2 and the second case section 3.

Second Embodiment

Subsequently, the configuration of the sensor head according to the second embodiment will be described. FIG.

Figure 7:
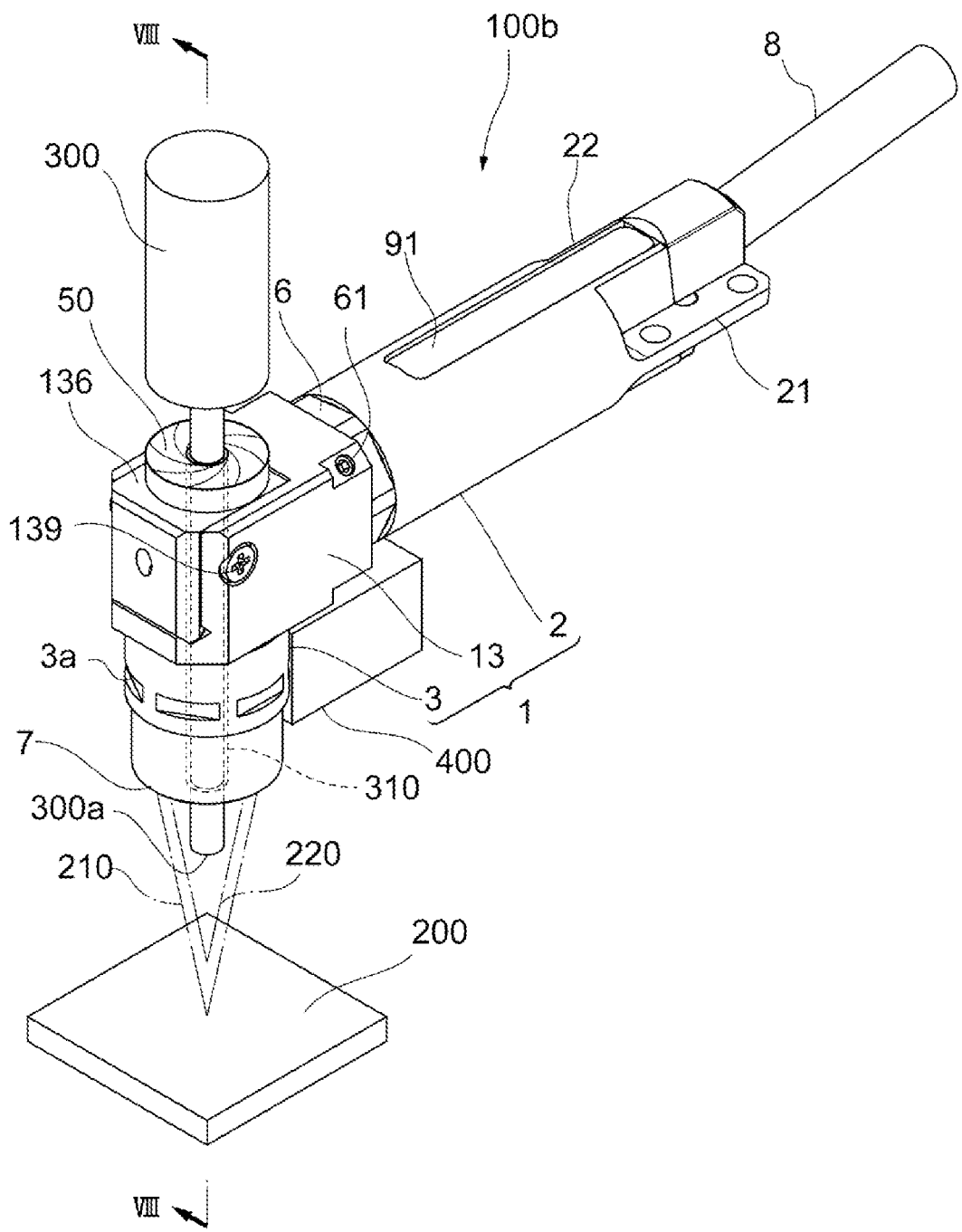
FIG. 7 is a perspective view showing the sensor head according to the second embodiment.
Figure 8:
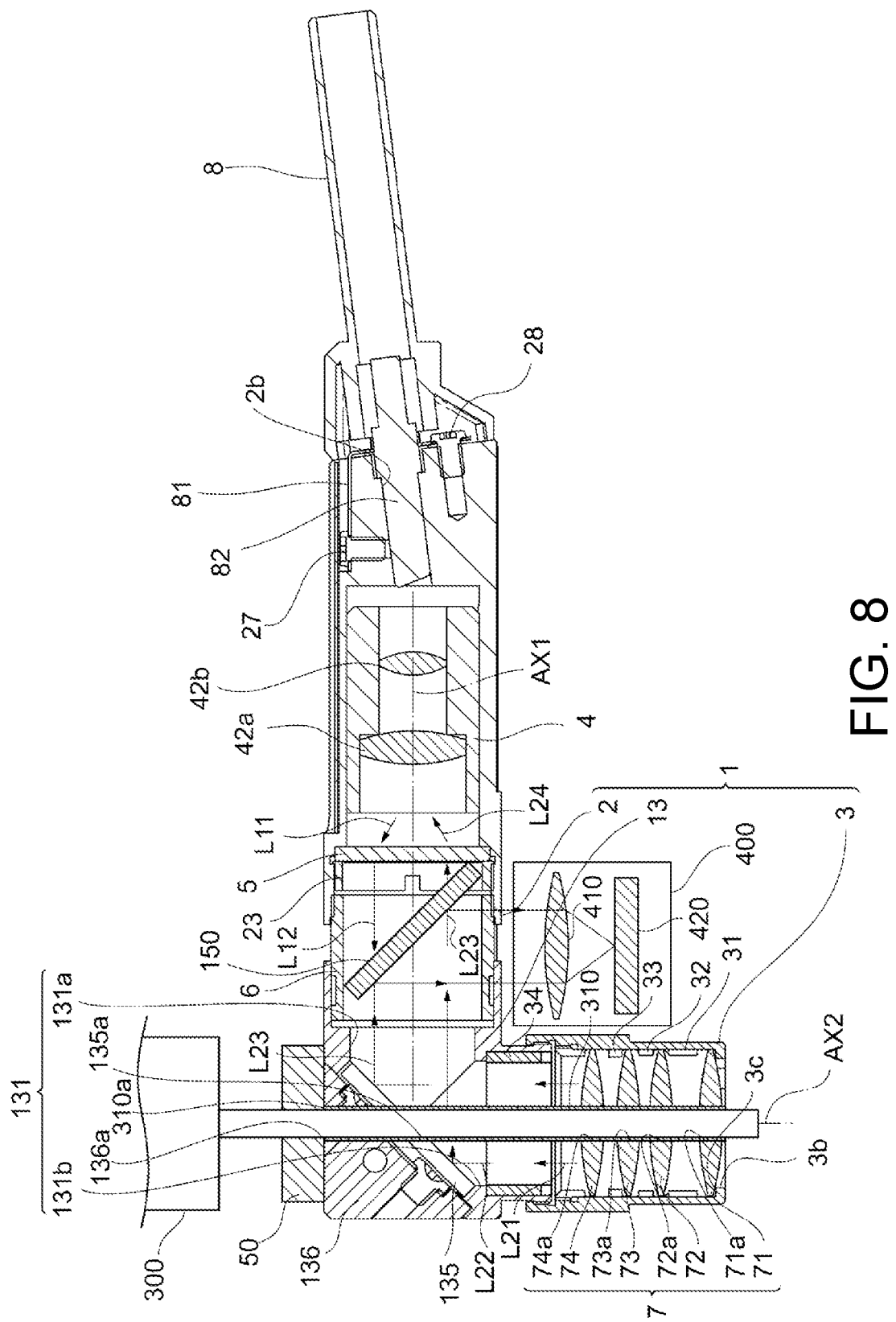
FIG. 8 is a cross-sectional view showing the VIII-VIII cross section of FIG. 7.

7 is a perspective view showing the configuration of the sensor head 100b according to the second embodiment. FIG. 8 is a cross-sectional view showing the VIII-VIII cross section of FIG. 7. The sensor head 100b according to the second embodiment is added with a half mirror 150, an imaging device 400, etc. in addition to the configuration of the sensor head 100 shown in the first embodiment, and other configurations and functions are the same as those of the sensor head 100 according to the first embodiment. Therefore, the same reference numerals as those of the first embodiment are used for the same parts as the sensor head 100 of the first embodiment, and the description thereof will be omitted.

The half mirror 150 is arranged between the lens 5 and the objective lens 7 in the case 1. In the present embodiment, the half mirror 150 is arranged in the connecting member 6 between the mirror member 135 and the lens 5. The half mirror 150 has a function of branching a part of the light in the direction toward the side of the lens 5 due to the mirror member 135 after the light reflected by the measurement object 200 passes through the objective lens group 7. In the present embodiment, the half mirror 150 is arranged so as to be inclined so that the light reflected by the half mirror 150 is introduced into the imaging device 400. A transmission portion (not shown) that allows light to pass (transmit) is formed in the case 1 so that the light reflected by the half mirror 150 is introduced into the imaging device 400 connected outside the case 1.

The imaging device 400 (for example, a camera or the like) includes a light receiving lens 410 that collects the light reflected by the half mirror 150, and an imaging element 420 that generates image data (image information) based on the light received collected by the light receiving lens 410. The light reflected by the half mirror 150 passes through the light receiving lens 410 in the imaging device 400 and is sent to the imaging element 420 (for example, a photodiode array, a CCD, a CMOS imaging element or the like) to form an image.

An operation example of the sensor head 100b according to the second embodiment will be described. As shown in FIG. 8, the reflected light L21 reflected by the measurement object 200 is changed in the direction toward the side of the lens 5 by the mirror member 135, and is guided to the half mirror 150. Thereafter, the light is reflected by the half mirror 150 and the direction thereof changes (the reflected light L23 shown in FIG. 8), and as shown in FIG. 8, the light is guided to the light receiving lens 410 in the imaging device 400 and is collected by the light receiving lens 410. The imaging element 420 receives the light collected by the light receiving lens 410 and generates the image data.

By providing the configuration according to the second embodiment described above, the image data can be generated by the imaging device 400 that is capable of introducing the reflected light reflected by the measurement object 200. Thus, the measurement position of the sensor head 100b can be confirmed based on the image data.

The configuration including the half mirror 150 and the imaging device 400 described above is configured to allow observation of the measurement position of the sensor head 100b, but the invention is not limited thereto. For example, a mechanism (not shown) capable of changing the orientation of the mirror member 135 by 90° may be provided, and after the direction of the reflected light from the diaphragm mechanism 50 is changed by the mirror member 135 with the orientation changed, the reflected light may be reflected by the half mirror 150 and introduced into the imaging device 400 for observing the state of the diaphragm mechanism 50.

Third Embodiment

Figure 9:
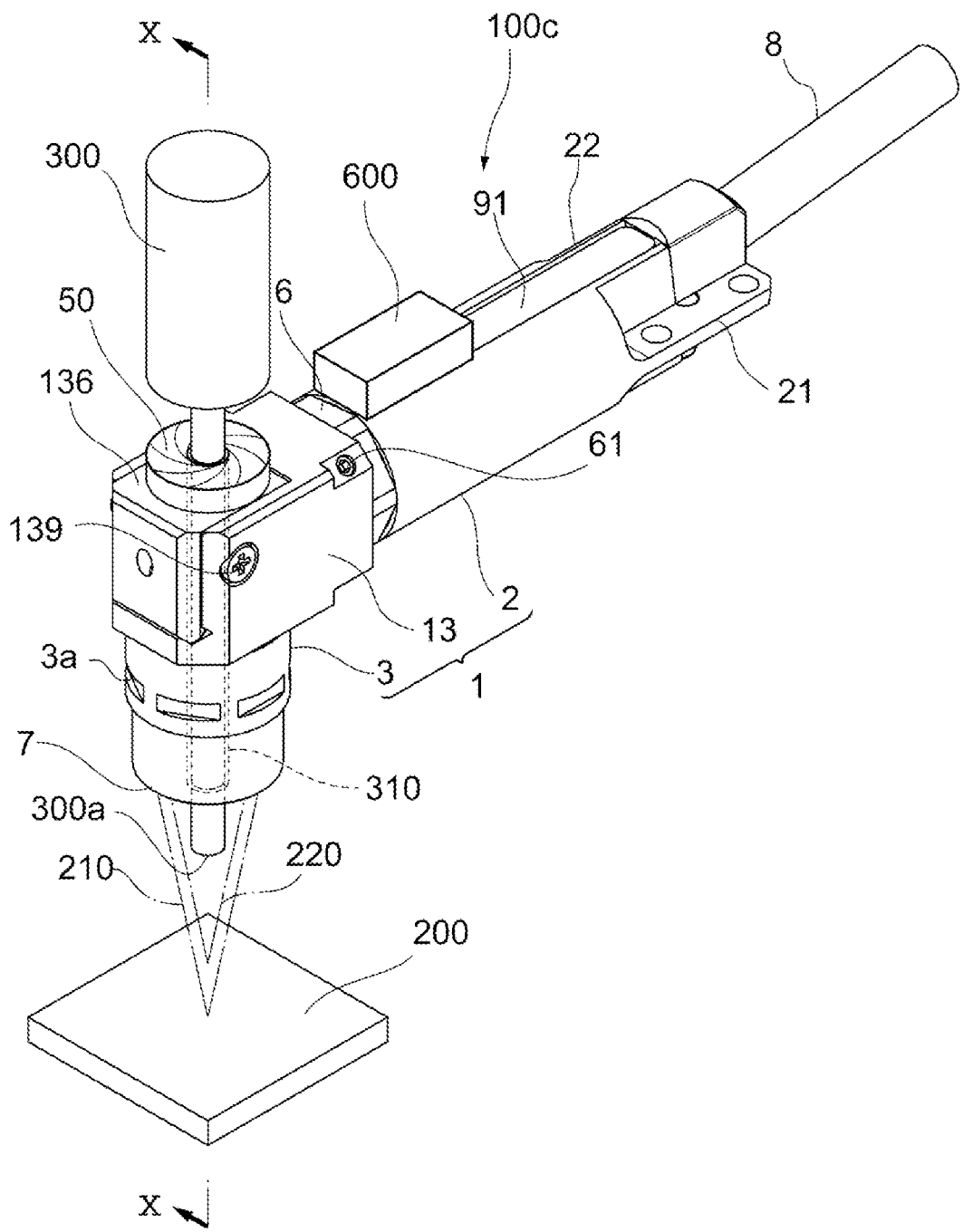
FIG. 9 is a perspective view showing the sensor head according to the third embodiment.
Figure 10:
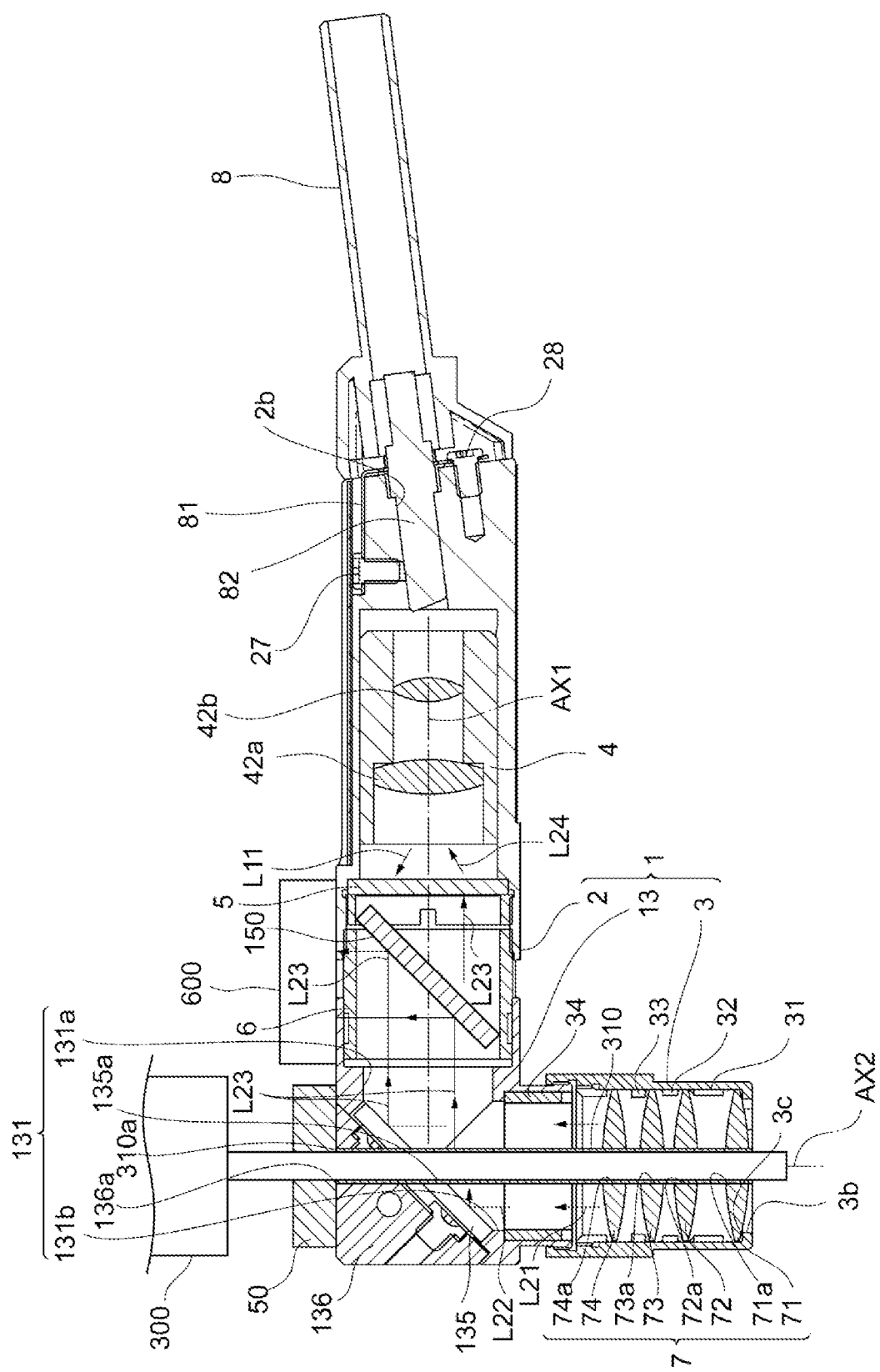
FIG. 10 is a cross-sectional view showing the X-X cross section of FIG. 9.
Figure 11:
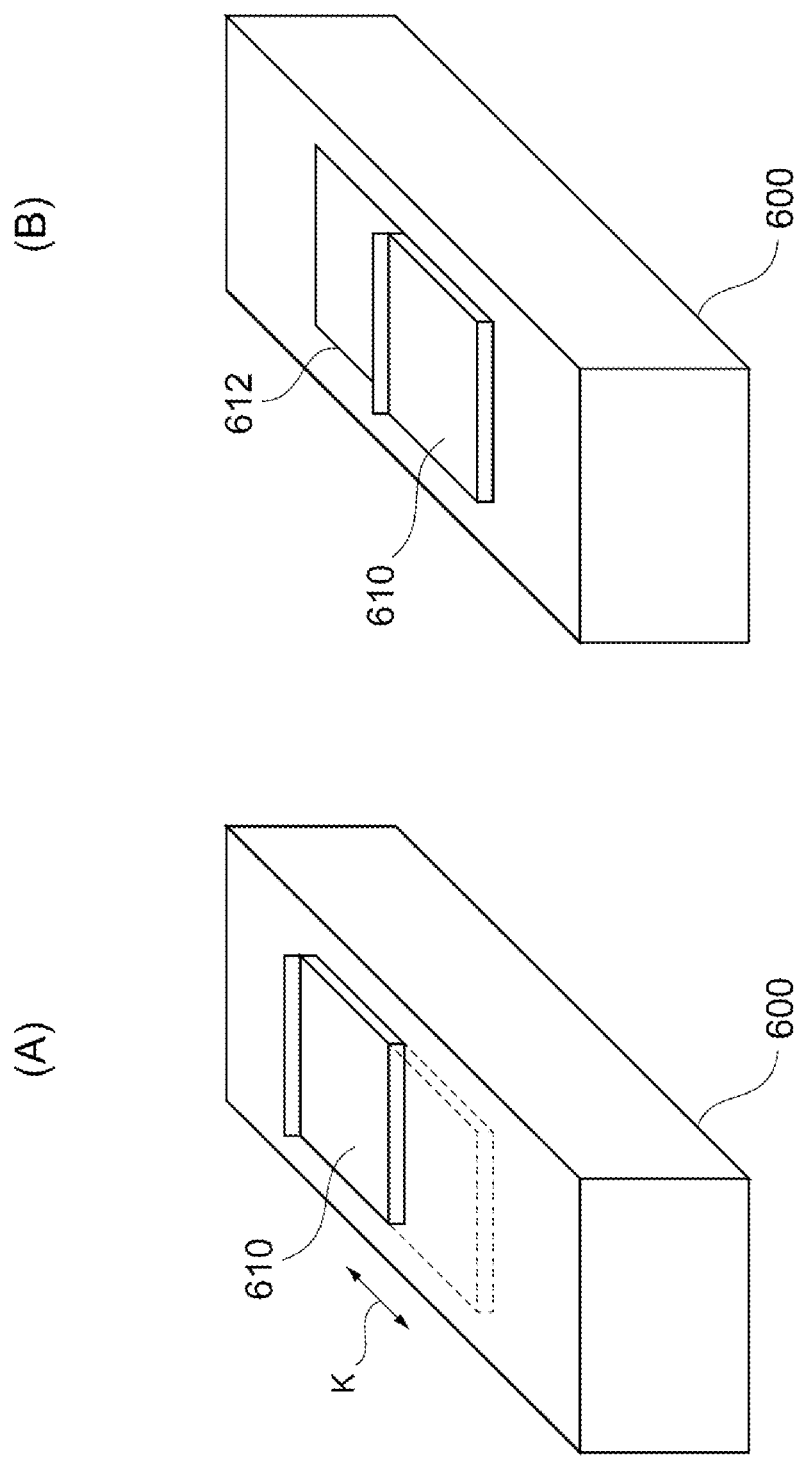
FIG. 11 provides views for illustrating the configuration of the opening/closing window provided in the housing of FIG. 9.

Subsequently, the configuration of the sensor head according to the third embodiment will be described. FIG. 9 is a perspective view showing the configuration of the sensor head 100c according to the third embodiment. FIG. 10 is a cross-sectional view showing the X-X cross section of FIG. 9. FIG. 11 provides views for illustrating an opening/closing window 610 provided in a housing 600 of FIG. 9. The sensor head 100c according to the third embodiment is added with the half mirror 150, the housing 600, the opening/closing window 610, etc. in addition to the configuration of the sensor head 100 shown in the first embodiment, and other configurations and functions are the same as those of the sensor head 100 according to the first embodiment. Therefore, the same reference numerals as those of the first embodiment are used for the same parts as the sensor head 100 of the first embodiment, and the description thereof will be omitted.

As shown in FIG. 9, the housing 600 is arranged on the upper surface side of the case 1 of the sensor head 100c. The housing 600 has, for example, a hollow box shape, and the opening/closing window 610 is provided on one surface thereof. As illustrated in FIG. 11, the opening/closing window 610 is configured to be slidable along one surface of the housing 600 (for example, slidable in the direction of the arrow K (the longitudinal direction of the sensor head 100c)). As shown in (A) of FIG. 11, when the opening/closing window 610 is moved to one side, the housing 600 is in a closed state and is in a state where the inside of the hollow housing 600 cannot be visually recognized. On the other hand, as shown in (B) of FIG. 11, when the opening/closing window 610 is moved to the other side, the housing 600 is in an open state and is in a state where a cover glass 612 provided on the housing 600 is exposed so that the inside of the hollow housing 600 can be visually recognized through the cover glass 612. A mechanism (not shown) capable of fixing the opening/closing window 610 to the housing 600 in the closed state described above may be provided so that the opening/closing window 610 does not open unintentionally. In the present embodiment, the housing 600 is provided at a position where the light branched by the half mirror 150 arranged in the case 1 can be introduced inside. The housing 600 in the present embodiment can have any structure as long as the light passing through the case 1 can be introduced into the housing 600. For example, an opening portion (not shown) may be formed on the bottom surface (the surface where the housing 600 and the case 1 come into contact with each other), and the opening portion and an opening (not shown) formed on the outer surface of the case 1 may be communicated with each other inside to introduce the light passing through the case 1 into the housing 600.

The half mirror 150 shown in FIG. 10 is arranged between the lens 5 and the objective lens 7 in the case 1. The half mirror 150 has a function of branching a part of the light directed from the objective lens 7 toward the side of the lens 5. In the third embodiment, as shown in the drawing, the half mirror 150 is arranged in an inclined state so that a part of the light directed from the side of the objective lens 7 toward the side of the lens 5 (in other words, the light directed from the mirror member 135 toward the side of the lens 5) is introduced into the housing 600. A transmission portion (not shown) that allows light to pass (transmit) is formed in the case 1 so that the light reflected by the half mirror 150 is introduced into the housing 600 connected outside the case 1.

An operation example of the sensor head 100c according to the third embodiment will be described. As shown in FIG. 10, the reflected light L21 reflected by the measurement object 200 is changed in the direction toward the side of the lens 5 by the mirror member 135 (the light L23 shown in FIG. 10), and is guided to the half mirror 150. Thereafter, the light is reflected by the half mirror 150 and the direction thereof changes, and as shown in FIG. 10, the light is introduced into the housing 600. As described above, by setting the opening/closing window 610 (FIG. 11) provided on the housing 600 to the open state, the inside of the housing 600 and the inside of the case 1 communicating with and connected to the inside of the housing 600 can be visible. Thus, the measurement position of the sensor head 100c can be visually confirmed based on the reflected light reflected by the half mirror 150.

The configuration including the housing 600 that has the half mirror 150 and the opening/closing window 610 described above is configured to allow observation of the measurement position of the sensor head 100b, but the invention is not limited thereto. For example, a mechanism (not shown) capable of changing the orientation of the mirror member 135 by 90° may be provided, and after the direction of the reflected light from the diaphragm mechanism 50 is changed by the mirror member 135 with the orientation changed, the reflected light may be reflected by the half mirror 150 and introduced into the housing 600 for observing the state of the diaphragm mechanism 50 via the opening/closing window 610.

Figure 12:
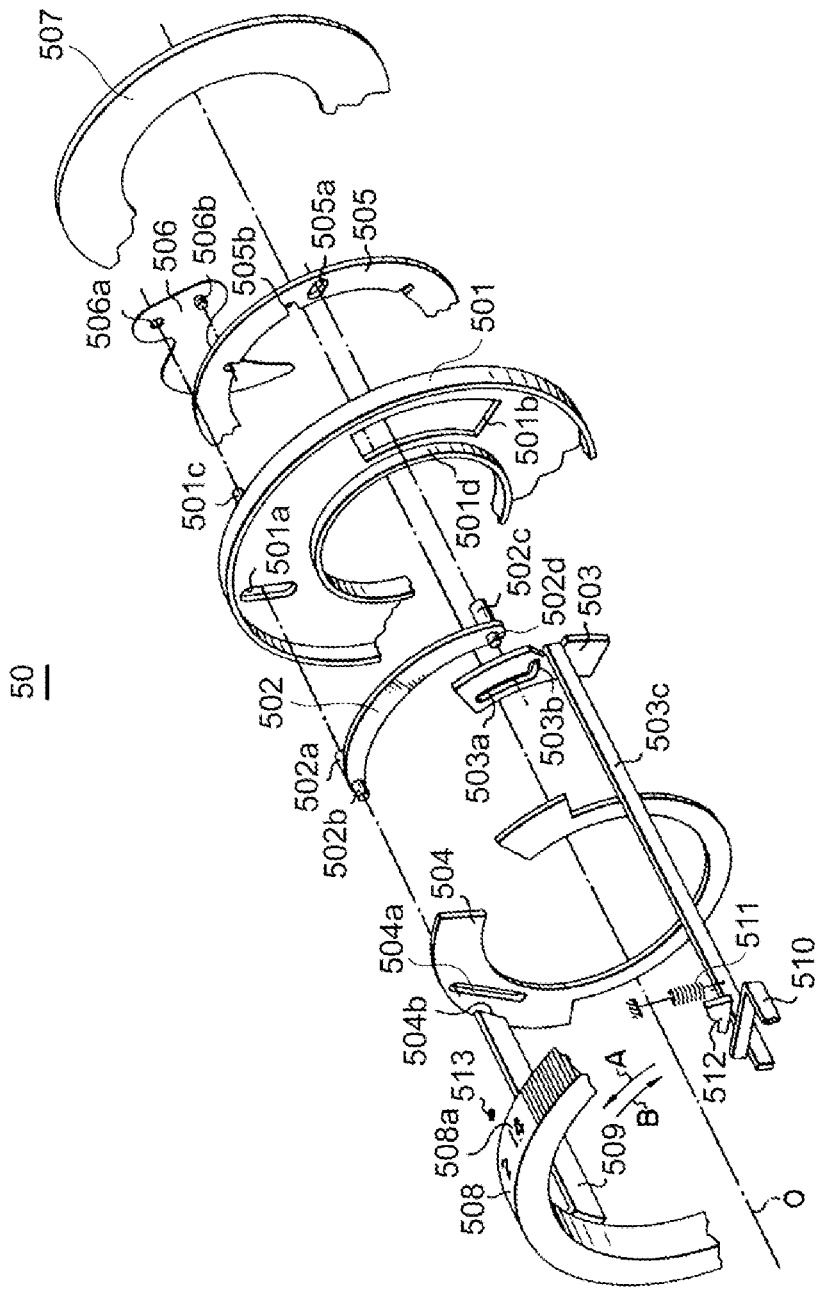
FIG. 12 is an exploded perspective view for illustrating the configuration of the diaphragm mechanism.

The configuration of the diaphragm mechanism 50 shown in FIG. 2, etc. will be described with reference to FIG. 12. FIG. 12 is an exploded perspective view showing an example of the configuration of the diaphragm mechanism 50. As will be described hereinafter, the diaphragm blades 506 of the diaphragm mechanism 50 can rotate around a pin 501c to change the size of the diaphragm diameter. By changing the diaphragm diameter, the diaphragm blades 506 can be brought into contact with or pressed against the outer peripheral surface of the object 300 (FIG. 2, etc.) inserted into the diaphragm mechanism 50 that has a hollow structure.

The diaphragm mechanism 50 has the diaphragm blades 506 shown in FIG. 12. A plurality of diaphragm blades 506 are provided (only one is shown in FIG. 12), a support hole 506a serving as the rotation fulcrum of the diaphragm blade 506 is fitted to the pin 501c planted on the front surface side of a diaphragm case 501, and a drive pin 506b on the diaphragm blade 506 is fitted into a notch 505b of an arrow wheel 505 rotatably fitted to the front surface of the diaphragm case 501. Therefore, if the arrow wheel 505 is rotated in the clockwise direction, that is, in the direction shown by the arrow B, with respect to the diaphragm case 501, the diaphragm blade 506 rotates around the pin 501c to reduce the diaphragm diameter. If the arrow wheel 505 is rotated in the counterclockwise direction, that is, in the direction shown by the arrow A, the diaphragm diameter is increased in a similar manner. By rotating the diaphragm blade 506 in this way to change the diaphragm diameter, the diaphragm blade 506 can be brought into contact with or pressed against the outer peripheral surface of the object 300 (FIG. 2, etc.) inserted into the diaphragm mechanism 50, and the object 300 can be fixed.

A blade holding member 507 may be attached to the diaphragm case 501 so as to hold the diaphragm blade 506 and the arrow wheel 505 and prevent these from coming off and prevent hindering the smooth movement of these members. A pin 502a on the front surface side at one end of an arc-shaped arm 502 arranged on the rear surface side of the diaphragm case 501 is fitted into an inclined elongated hole 501a provided on the diaphragm case 501, and a pin 502b on the rear surface side is fitted into a cam hole 504a provided on a holding cam plate 504 of the diaphragm mechanism. A pin 502c on the front surface side at the other end of the arm 502 penetrates an escape hole 501b of the diaphragm case 501 and is fitted into an inclined hole 505a formed in the arrow wheel 505. A pin 502d on the rear surface side at the other end of the arm 502 is fitted into an arc hole 503a that is formed in a diaphragm plate 503 of the diaphragm mechanism and is equidistant from the central axis O, or an inclined hole 503b that has an inclination in the radial direction from one end of the arc hole 503a and has the same shape as the inclined hole 505a. The holding cam plate 504 is fitted into a groove (not shown) provided in an inner peripheral wall 501d of the diaphragm case 501, and the diaphragm plate 503 is slidably pressed along the inner peripheral wall 501d of the diaphragm case 501 so as not to fall out of the diaphragm case 501.

A connecting arm 509 that has a long shape in parallel to the central axis O and has one end fixed to a diaphragm ring 508 may be fitted to a notch portion 504b of the holding cam plate 504. If the diaphragm ring 508 having a diaphragm value scale 508a is rotated, the holding cam plate 504 also rotates with respect to the diaphragm case 501 integrally with the diaphragm ring 508. Further, the diaphragm plate 503 is integrally provided with an arm portion 503c that extends rearward in parallel to the central axis O, and the arm portion 503c is urged in the direction of the arrow A by the tensile force of a predetermined elastic member 511 and comes into contact with an immovable member 512 to stop. A diaphragm lever 510 is engaged with the arm portion 503c.

Next, an operation example of the diaphragm mechanism 50 will be described based on the movement of the arm 502. Normally, when the diaphragm ring 508 is rotated to set the diaphragm value, the pins 502a and 502b at one end of the arm 502 move to the intersection of the cam hole 504a and the inclined elongated hole 501a, and the pins 502c and 502d at the other end of the arm 502 move on the inclined holes 505a and 503b, respectively. Then, when the diaphragm lever 510 is operated and the diaphragm plate 503 moves in the direction of the arrow B, the arm 502 rotates in the clockwise direction around the pins 502a and 502b, the arrow wheel 505 rotates integrally with the diaphragm plate 503 until the pin 502d is to move from the inclined hole 503b to the arc hole 503a, and when the pin 502d reaches the arc hole 503a, the rotation of the arm 502 is stopped and the diaphragm plate 503 continues to rotate, but the arrow wheel 505 does not rotate and is in a stopped state like the arm 502. The rotation angle of the arrow wheel 505 appears as a change in the diaphragm diameter and the rotation angle of the arrow wheel 505 is determined by the position of the pin 502d on the inclined hole 503b, and the position of the pin 502d is determined by the angle of the holding cam plate 504 with respect to the diaphragm case 501, that is, the rotation angle of the diaphragm ring 508, i.e., the set diaphragm value. For example, if the diaphragm ring 508 is rotated in the direction of the arrow B, the set diaphragm value becomes large, and the pins 502a and 502b move toward the central axis O due to the relationship between the cam hole 504a and the inclined elongated hole 501a. Therefore, the pins 502c and 502d move on the inclined holes 503b and 505a in the direction further away from the central axis O. Thus, when the diaphragm lever 510 is operated, the rotation angle of the arrow wheel 505 becomes larger and the diaphragm diameter becomes smaller. On the contrary, if the diaphragm ring 508 is rotated in the direction of the arrow A, the set diaphragm value becomes small, and similarly, the pins 502a and 502b move in the direction further away from the central axis O due to the relationship between the cam hole 504a and the inclined elongated hole 501a. Therefore, the pins 502c and 502d move on the inclined holes 503b and 505a in the direction closer to the central axis O. Thus, when the diaphragm lever 510 is operated, the rotation angle of the arrow wheel 505 becomes smaller and the diaphragm diameter becomes larger.

Nevertheless, the configuration of the diaphragm mechanism 50 in the present embodiment is not limited to the configuration shown in the drawing. The configuration can be transformed into various other forms as long as it has a function of changing the diaphragm diameter to fix the object 300 inserted into the diaphragm mechanism 50.

The embodiments described above are provided for facilitating the understanding of the invention, and are not for limiting and interpreting the invention. Each element included in the embodiments and its arrangement, material, condition, shape, size, etc. are not limited to those exemplified, and can be changed as appropriate. In addition, the configurations shown in different embodiments can be partially replaced or combined.

[Appendix]

A sensor head (100) of a sensor that measures a position of a measurement object (200) includes: a lens (5) emitting light incident from a light source side along an optical axis (AX1) and causing chromatic aberration in the light; an objective lens (7) arranged on a measurement object (200) side with respect to the lens (5), and collecting and emitting light incident from a lens (5) side to the measurement object (200) side and emitting light incident from the measurement object (200) side to the lens (5) side; and a case (1) having an accommodation space inside and accommodating at least the lens (5) and the objective lens (7) in the accommodation space, wherein the case (1) includes a first case section (2) having the lens (5) inside, a second case section (3) having the objective lens (7) inside, and a third case section (13) connecting between the first case section (2) and the second case section (3), a mirror member (135) bending the light incident from the lens (5) side toward the objective lens (7) side is arranged inside the third case section (13), and a tube (310) being hollow and communicating through holes respectively formed in the objective lens (7) and the mirror member (135) is provided.

What is claimed is:

1. A sensor head of a sensor that measures a position of a measurement object, the sensor head comprising:
   a lens emitting light incident from a light source side along an optical axis and causing chromatic aberration in the light;
   an objective lens arranged on a measurement object side with respect to the lens, and collecting and emitting light incident from a lens side to the measurement object side and emitting light incident from the measurement object side to the lens side; and
   a case having an accommodation space inside and accommodating at least the lens and the objective lens in the accommodation space,
   wherein the case comprises a first case section having the lens inside, a second case section having the objective lens inside, and a third case section connecting between the first case section and the second case section,
   a mirror member bending the light incident from the lens side toward an objective lens side is arranged inside the third case section, and
   a tube being hollow and communicating through holes respectively formed in the mirror member and the objective lens is provided.

2. The sensor head according to claim 1, wherein the tube is arranged to extend in a direction along an optical axis of light emitted from the objective lens to the measurement object side.

3. The sensor head according to claim 1, wherein a diaphragm mechanism fixing an object inserted into the tube is provided at an upper end of the tube.

4. The sensor head according to claim 3, wherein the diaphragm mechanism comprises a diaphragm blade that changes a diaphragm diameter, and
   the object is fixed by bringing the diaphragm blade into contact with an outer peripheral surface of the object.

5. The sensor head according to claim 1, wherein a half mirror member branching light emitted from the objective lens to the lens side is provided between the objective lens and the lens, and
   an imaging device receiving light branched by the half mirror member and generating image information indicating a measurement position of the sensor head is provided.

6. The sensor head according to claim 5, wherein the imaging device comprises:
   a light receiving lens collecting the light branched by the half mirror member; and
   an imaging element generating the image information based on light collected by the light receiving lens.

7. The sensor head according to claim 1, wherein a half mirror member branching the light emitted from the objective lens to the lens side is provided between the objective lens and the lens, and
   an opening/closing window receiving light branched by the half mirror member and monitoring the measurement position of the sensor head is provided.

8. The sensor head according to claim 2, wherein a diaphragm mechanism fixing an object inserted into the tube is provided at an upper end of the tube.

9. The sensor head according to claim 2, wherein a half mirror member branching light emitted from the objective lens to the lens side is provided between the objective lens and the lens, and
   an imaging device receiving light branched by the half mirror member and generating image information indicating a measurement position of the sensor head is provided.

10. The sensor head according to claim 3, wherein a half mirror member branching light emitted from the objective lens to the lens side is provided between the objective lens and the lens, and
   an imaging device receiving light branched by the half mirror member and generating image information indicating a measurement position of the sensor head is provided.

11. The sensor head according to claim 4, wherein a half mirror member branching light emitted from the objective lens to the lens side is provided between the objective lens and the lens, and an imaging device receiving light branched by the half mirror member and generating image information indicating a measurement position of the sensor head is provided.

12. The sensor head according to claim 2, wherein a half mirror member branching the light emitted from the objective lens to the lens side is provided between the objective lens and the lens, and an opening/closing window receiving light branched by the half mirror member and monitoring the measurement position of the sensor head is provided.

13. The sensor head according to claim 3, wherein a half mirror member branching the light emitted from the objective lens to the lens side is provided between the objective lens and the lens, and an opening/closing window receiving light branched by the half mirror member and monitoring the measurement position of the sensor head is provided.

14. The sensor head according to claim 4, wherein a half mirror member branching the light emitted from the objective lens to the lens side is provided between the objective lens and the lens, and an opening/closing window receiving light branched by the half mirror member and monitoring the measurement position of the sensor head is provided.

15. The sensor head according to claim 5, wherein a half mirror member branching the light emitted from the objective lens to the lens side is provided between the objective lens and the lens, and an opening/closing window receiving light branched by the half mirror member and monitoring the measurement position of the sensor head is provided.

16. The sensor head according to claim 6, wherein a half mirror member branching the light emitted from the objective lens to the lens side is provided between the objective lens and the lens, and an opening/closing window receiving light branched by the half mirror member and monitoring the measurement position of the sensor head is provided.

\* \* \* \* \*